(12) United States Patent
Samarao et al.

(10) Patent No.: US 9,903,763 B2
(45) Date of Patent: Feb. 27, 2018

(54) TITANIUM NITRIDE FOR MEMS BOLOMETERS

(71) Applicant: Robert Bosch GmbH, Stuttgart (DE)

(72) Inventors: Ashwin K. Samarao, Mountain View, CA (US); Gary O'Brien, Palo Alto, CA (US); Ando Feyh, Palo Alto, CA (US); Fabian Purkl, Rutesheim (DE); Gary Yama, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/022,601

(22) PCT Filed: Sep. 26, 2014

(86) PCT No.: PCT/US2014/057689
§ 371 (c)(1),
(2) Date: Mar. 17, 2016

(87) PCT Pub. No.: WO2015/048424
PCT Pub. Date: Apr. 2, 2015

(65) Prior Publication Data
US 2016/0223404 A1    Aug. 4, 2016

Related U.S. Application Data

(60) Provisional application No. 61/883,607, filed on Sep. 27, 2013.

(51) Int. Cl.
*G01J 5/20* (2006.01)
*G01J 5/02* (2006.01)

(52) U.S. Cl.
CPC ............... *G01J 5/20* (2013.01); *G01J 5/024* (2013.01)

(58) Field of Classification Search
CPC .. G01J 5/20; G01J 5/024; G01J 5/0853; G01J 5/10; H01L 31/09; H01L 37/02
(Continued)

(56) References Cited

U.S. PATENT DOCUMENTS 7,002,153 B1    2/2006 Gillham et al.
2004/0140428 A1*  7/2004 Ionescu ............ H01L 27/14669
250/338.1
(Continued)

FOREIGN PATENT DOCUMENTS

JP    2003-337066 A    11/2003
WO   2013/010933 A1   1/2013

OTHER PUBLICATIONS

International Search Report corresponding to PCT Application No. PCT/US2014/057689, dated Jan. 8, 2014 (3 pages).
(Continued)

*Primary Examiner* — Evan Pert
*Assistant Examiner* — Changhyun Yi
(74) *Attorney, Agent, or Firm* — Maginot Moore & Beck LLP

(57) ABSTRACT

A method for fabricating a semiconductor device includes patterning a sacrificial layer on a substrate to define a bolometer, with trenches being formed in the sacrificial layer to define anchors for the bolometer, the trenches extending through the sacrificial layer and exposing conductive elements at the bottom of the trenches. A thin titanium nitride layer is then deposited on the sacrificial layer and within the trenches. The titanium nitride layer is configured to form a structural support for the bolometer and to provide an electrical connection to the conductive elements on the substrate.

7 Claims, 4 Drawing Sheets

(58) Field of Classification Search
USPC .................................. 257/32, 425; 250/338.1
See application file for complete search history.

(56) References Cited

U.S. PATENT DOCUMENTS

| | | | |
|---|---|---|---|
| 2004/0200962 A1 | 10/2004 | Ishikawa et al. | |
| 2009/0140148 A1* | 6/2009 | Yang ........................ | G01J 5/20 250/338.4 |
| 2011/0042569 A1* | 2/2011 | Cho ........................ | G01J 5/20 250/338.3 |
| 2011/0049366 A1* | 3/2011 | Yang ........................ | G01J 5/04 250/338.4 |
| 2013/0234270 A1 | 9/2013 | Yama et al. | |
| 2014/0048708 A1* | 2/2014 | Ouvrier-Buffet ......... | G01J 5/24 250/338.1 |

OTHER PUBLICATIONS

Supplementary European Search Report corresponding to European Application No. 14 84 7383 (8 pages).

\* cited by examiner

TITANIUM NITRIDE FOR MEMS BOLOMETERS

CROSS-REFERENCE TO RELATED APPLICATIONS

This application is a 35 U.S.C. § 371 National Stage Application of PCT/US2014/057689, filed on Sep. 26, 2014, which claims the benefit of priority to U.S. Provisional Application No. 61/883,607, filed on Sep. 27, 2013 and entitled "Titanium Nitride for MEMS Bolometers," the disclosures of which are incorporated herein by reference in their entireties.

TECHNICAL FIELD

This disclosure relates generally to bolometer sensors, and in particular to microelectromechanical system (MEMS) bolometer sensors.

BACKGROUND

In general, bolometer sensors are used in a variety of applications to detect infrared radiation and provide an electrical output that is a measure of the incident infrared radiation. A bolometer typically includes an absorber element for absorbing infrared radiation and a transducer element that has an electrical resistance that varies with temperature. In operation, infrared radiation incident upon the bolometer will be absorbed by the absorber element of the bolometer and the heat generated by the absorbed radiation will be transferred to the transducer element. As the transducer element heats in response to the absorbed radiation, the electrical resistance of the transducer element will change in a predetermined manner. By detecting changes in the electrical resistance, a measure of the incident infrared radiation can be obtained.

Recent advances in technology have enabled bolometer devices to be fabricated using MEMS technology integrated into complementary metal oxide semiconductor (CMOS) processes. In previously known CMOS fabrication processes, alumina was used for the structural layer that forms the absorber because it is capable holding its shape and also because provides a good seed layer for atomic layer deposition (ALD) of platinum, which is used as the functional layer for the absorber element. However, the use of alumina as the structural support and seed layer for the absorber element has raised issues in fabrication process that can adversely affect yield. One issue raised by the use of alumina is that, because alumina is an insulator, it must be patterned to provide the openings that allow the functional layer of the absorber to make electrical contact with the underlying metal runners. Alumina is structurally very strong. As a result, the patterning of alumina, which is done by some form of etching, can be very challenging and slow.

As an example, $BCl_3/Cl_2$ gases can be used in plasma to chemically etch alumina. However, under best-case scenarios, the etch rates are as slow as ~1 nm/min. A physical etch process, such as ion milling, can also be used to pattern alumina. For example, argon ion milling can be used to physically sputter alumina but the etch rates are even slower at ~0.5 nm/min. Furthermore, since very small areas of the alumina need to be patterned, the etch rates can be even slower than the typical etch rates for alumina and thereby further increase the process duration.

The relatively long processing duration of alumina decreases the yield of the fabrication process. The duration of patterning process of alumina can also result in damage to other structures during the fabrication process. For example, photoresist is typically used as a mask during alumina patterning. Long durations under processes, such as ion milling, can damage the photoresist mask as well, thereby affecting the overall yield of the process. In addition, non-uniformity of the alumina etch process can result in residual alumina being left on the surface of the underlying metal runners which can prevent good electrical contact to the functional layer (e.g., platinum) of the absorber, thereby affecting the yield of the process

DETAILED DESCRIPTION

Figure 1:
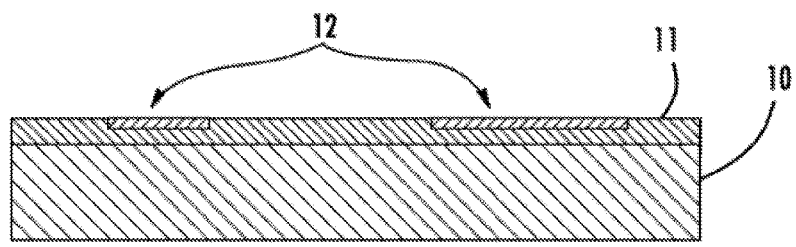
FIG. 1 depicts an oxidized silicon substrate having metal runners and bond-pads at the start of a previously known fabrication process for an ALD based MEMS bolometer.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to a person of ordinary skill in the art to which this disclosure pertains.

This disclosure is directed to a ALD MEMS bolometer in which the structural support and seed layer for the functional absorber layer is provided by titanium nitride (TiN) rather than alumina. Similar to alumina, titanium nitride is capable of providing a robust structural support for the absorber of the bolometer. Unlike alumina, however, titanium nitride is a conductor so it can also serve as a functional layer in the bolometer stack, thus presenting the potential to add on to the bolometer signal generated by the functional layer (e.g., platinum) of the absorber. In addition, in some cases, titanium nitride can be used to provide the functional aspect of the absorber in addition to providing the structural support so that a separate functional layer for the absorber, such as platinum, can be omitted. Thus, unlike Alumina, Titanium Nitride does not remain as a passive structural support layer but plays an active role in the bolometer operation in addition to being a structural support layer.

In one embodiment, a method of fabricating a semiconductor device is provided. According to the method, a sacrificial layer is deposited on a substrate over conductive elements, such as conductive traces, runners, and/or bond pads. The sacrificial layer is then patterned to define the shape of the bolometer with trenches being formed in the sacrificial layer above the conductive elements that extend through the sacrificial layer to expose the conductive elements. The trenches are configured to define anchors for supporting and suspending the bolometer apart from the substrate.

A structural layer comprising titanium nitride is then deposited on top of the patterned sacrificial layer, the structural layer being deposited within the trenches in contact with the conductive elements at the bottom of the trenches to form the anchors. A functional layer for the bolometer is then formed on the structural layer. The functional layer is formed of a conductive material, such as metal. The structural layer is interposed between the functional layer and the conductive elements at the bottom of the trenches and is used to electrically connect the functional layer to the conductive elements.

The sacrificial layer may then be removed to release the bolometer and define a gap between the substrate and bolometer. The conductive elements may comprise bond pads, conductive traces, runners and the like, and may be formed at least partially on an oxide layer of the substrate.

In one embodiment, the titanium nitride layer is deposited to a thickness between approximately 5 nm and 60 nm. The titanium nitride layer may be deposited using an atomic layer deposition process to the desired thickness. In one embodiment, the functional layer comprises platinum which may also be deposited using an atomic layer deposition process. The platinum may be deposited to a thickness that is approximately 10 nm or less. The titanium nitride may be used as a seed layer for ALD of platinum.

In another embodiment, a semiconductor device is provided. The semiconductor device comprises a silicon substrate having conductive elements formed thereon. A bolometer is formed on the silicon substrate. The bolometer includes a structural layer comprising titanium nitride. The titanium nitride structural layer forms anchor structures that are positioned in contact with the conductive elements and extend from the conductive elements away from the substrate to space a portion of the structural layer apart from the substrate. The titanium nitride structural layer is mechanically and electrically connected to the conductive elements.

The titanium nitride structural layer may be deposited to a thickness of 5 nm to 60 nm, e.g., using an ALD process. In one embodiment, the titanium nitride is configured to serve as a functional layer for the bolometer in addition to the structural layer. In another embodiment, the bolometer further comprises a functional layer formed of a metal material deposited onto the titanium nitride structural layer. In this embodiment, the titanium nitride structural layer is interposed between the functional layer and the conductive elements and is used to electrically connect the functional layer to the conductive elements.

In other embodiments, additional layer(s) and/or layer sequences may be used be used to tailor the properties of the bolometer, such as the temperature coefficient of resistance, to produce a desired response. For example, an additional titanium nitride layer may be formed on top of the functional layer. In this embodiment, the functional layer comprising platinum and the additional titanium nitride layer may each have a thickness that approximately 10 nm or less. As another example, an additional layer comprising alumina may be formed on top of the functional layer. In this embodiment, titanium nitride can be used to electrically and mechanically connect the bolometer to the conductive elements, e.g., bond pads, and the alumina layer can be used to provide additional structural support without having to be patterned.

Figure 2:
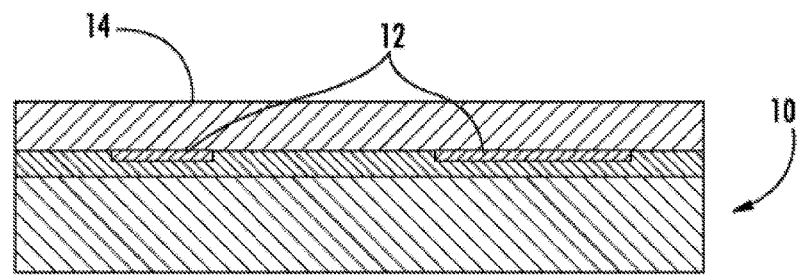
FIG. 2 depicts the substrate of FIG. 1 after a sacrificial layer has been deposited on the substrate.
Figure 3:
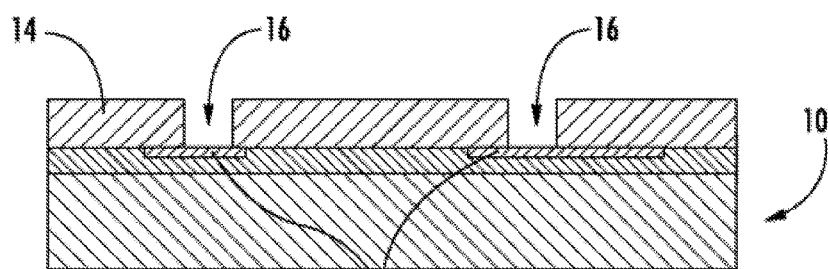
FIG. 3 depicts the substrate of FIG. 2 after the sacrificial layer has been patterned to form trenches that define anchor structures for the absorber element.

A fabrication process for an ALD MEMS bolometer that utilizes titanium nitride as a support layer (and in some cases the functional layer as explained below) for the absorber is described with reference to FIGS. 1-9. Referring to FIG. 1, the fabrication process typically starts with an silicon substrate 10 having an oxide layer 11 and conductive elements 12, such as metal runners and bond-pads, for connecting the bolometer to other circuit elements (not shown). A sacrificial layer 14 is then deposited onto the substrate as depicted in FIG. 2. The sacrificial layer 14 may comprise one or more layers of one or more material, such as oxide, polysilicon, photoresist, and the like. Referring to FIG. 3, the sacrificial layer 14 is patterned to form trenches 16 that define the position and configuration of anchor structures that will be used to both suspend the absorber element above the substrate 10 and attach the absorber element to the substrate.

Figure 4:
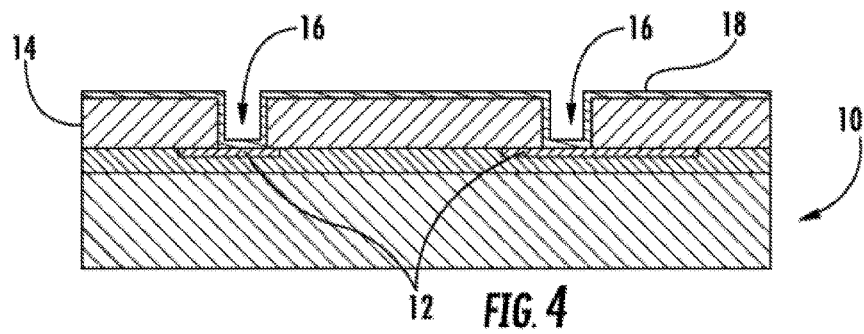
FIG. 4 depicts the substrate of FIG. 3 after an alumina insulator layer has been deposited on the sacrificial layer and in the trenches.

As depicted in FIG. 4, an atomic layer deposition (ALD) process is then used to deposit a structural layer 18 on top of the patterned sacrificial layer. The structural layer 18 forms a structural element that is capable of being suspended above the surface of the substrate and providing support for a conductive layer that will serve as the absorber element for the bolometer. The structural layer 18 is also deposited along the side walls and bottoms of the trenches to form the anchors for the absorber.

Figure 5:
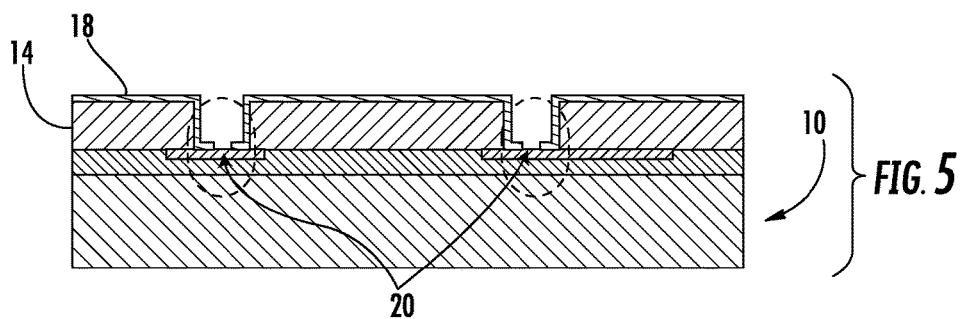
FIG. 5 depicts the substrate of FIG. 4 after the alumina insulator layer has been patterned to provide contact openings through to the underlying metal runners.

In previously known bolometer fabrication processes, the structural layer 18 for the absorber is typically provided by an ALD of Alumina ($Al_2O_3$). Alumina was used because it is capable of giving structural robustness to the absorber element, and also because provides a good seed layer for ALD of platinum, which is used as the functional layer for the absorber element. Because alumina is an insulator, the structural layer 18 must be selectively etched at the bottom of the trenches as depicted in FIG. 5. The etching is used to form openings 20 to allow the functional layer of the absorber to make electrical contact with the metal conductors on the surface of the substrate.

Figure 6:
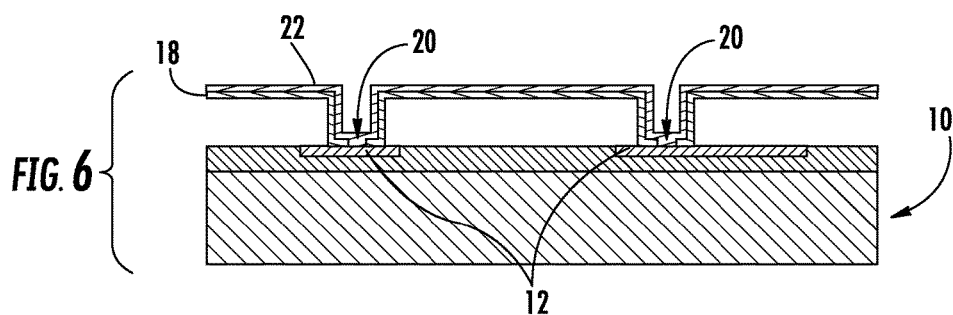
FIG. 6 depicts the substrate of FIG. 5 after the metal functional layer for the absorber has been deposited onto the alumina insulator and the sacrificial layer has been removed to suspend the insulating layer and the absorber above the substrate.

After the patterning of the structural layer 18, an ALD process is used to deposit a thin metal film layer 22 on top of the structural layer 18 that serves as the functional layer for the absorber. The metal layer 22 makes contact with the metal runners 12 on the substrate 10 which will be used to carry electrical signals between the absorber and other circuitry located on or external to the substrate. As a last-step, the sacrificial layer 14 is removed, e.g., by etching, to release the structural layer 18 and functional layer 22 resulting in an absorber element that is suspended and supported structurally above the substrate 10 as depicted in FIG. 6.

Figure 7:
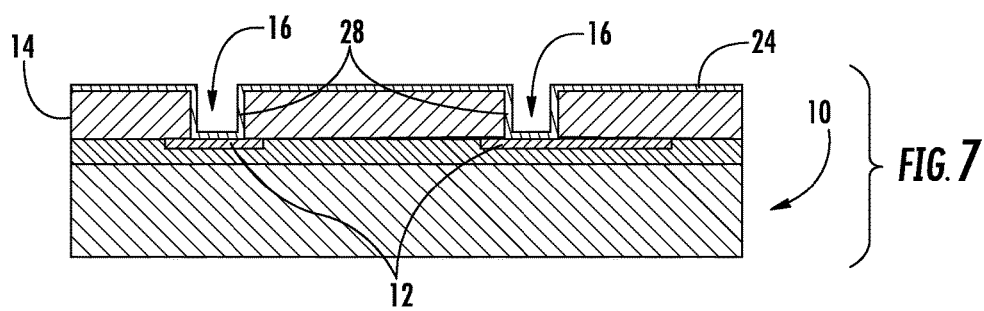
FIG. 7 depicts an embodiment of a bolometer during a fabrication process, such as depicted in FIG. 4, in which titanium nitride has been substituted for the alumina in accordance with the disclosure.

Referring to FIG. 7, the titanium nitride (TiN) 24 is deposited using an ALD process. Similar to alumina, ALD of TiN is also very well characterized using the precursor Tetrakis(dimethylamido)Titanium or TDMAT and $N_2$ (or $NH_3$) Both thermal and plasma-enhanced ALD of TiN layers can be deposited. TiN is also CMOS-compatible which allows the ALD to be performed as part of a CMOS process. In addition, TiN is less thermally conductive than alumina (19.2 W/mK for TiN vs. 30 W/mK for alumina) which helps to thermally isolate the absorber from the substrate and improve absorber efficiency.

The TiN layer 24 forms a planar structural element that is capable of being suspended above the surface of the substrate and that lines the walls and bottoms of the trenches 16 to form anchors 28 capable of supporting the planar structural element above the substrate 10. The TiN is deposited using ALD to a suitable thickness that is structurally rigid and repeatable without compromising bolometer functionality. The thickness of the TiN layer may also be selected based on a desired temperature co-efficient of resistance (TCR). In one embodiment, the TiN is deposited at a thickness that is 5 nm (or less) to 60 nm (or more). In one particular embodiment, TiN is deposited at a thickness of 10 nm.

Figure 8:
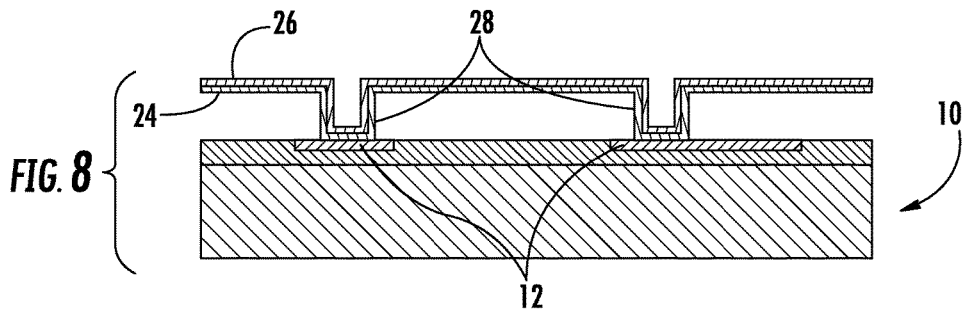
FIG. 8 depicts the substrate of FIG. 7 after a metal functional layer for the absorber has been deposited onto the titanium nitride and the sacrificial layer has been removed to suspend the titanium nitride layer and the functional layer above the substrate.

In the embodiment depicted in FIG. 8, a functional layer 26 for the absorber is deposited on top of the TiN layer 24. After the functional layer has been deposited, the sacrificial layer is removed, e.g., by etching, to release the TiN layer 24 and functional layer 26 so that the functional layer is suspended and supported structurally above the substrate by the TiN layer as depicted in FIG. 8.

Unlike alumina, titanium nitride is a conductor with a very good electrical conductivity of 30~70 $\mu\Omega$-cm. Therefore, TiN can be used to electrically connect the functional layer of the absorber to the metal runners in the embodiment of FIG. 7 and does not have to be patterned as does alumina to provide electrical contact to a functional layer. As a consequence, the time-consuming patterning of alumina (the result of which is depicted in FIG. 5) can be avoided. In addition, the step of depositing a functional layer, such as platinum, so as to make direct contact with the metal runners on the substrate (as depicted in FIG. 6) can also be avoided.

In the embodiment of FIGS. 7 and 8, the functional layer 26 comprises an ALD of metal, and in particular, of platinum. TiN is a well known adhesion/seed layer for platinum. The Young's modulus of TiN is 251 GPa. This suggests that TiN is a very strong layer and lends structural integrity to layers adhering to it. TiN is also a well-known diffusion barrier. As a result, TiN can provide resistance from potential aging (from moisture, electromigration/current spiking, etc.,) for the functional bolometer layer (e.g., platinum).

In one embodiment, the platinum functional layer for the absorber is deposited to a thickness of less than 10 nm. At a thickness of less than 10 nm, the functional layer should be able to achieve an absorption level of greater than 95% (>95%) of Infrared radiation and generate a strong bolometer signal. However, at thicknesses below 10 nm, the positive TCR of Platinum reduces to about half compared to its bulk value (~$3.93\times10^{-3}$/° C.@Bulk vs.~$1.6\times10^{-3}$/° C. below 10 nm).

TiN is also capable of IR absorption. Similar to platinum, TiN has a positive temperature co-efficient of resistance (TCR) (although the TCR of bulk Pt is about ten times that of TiN $3.93\times10^{-3}$/° C. Vs. $0.4\times10^{-3}$/° C.). It's worth noting that at about 10 nm thickness, the TCR of TiN (~$0.36\times10^{-3}$/° C.) is about 25% of that of the same thickness of Platinum (~$1.6\times10^{-3}$/° C.). These characteristics could potentially be used to add to the overall bolometer signal in response to absorbed infrared radiation. Thus, unlike alumina, titanium nitride does not serve as a passive structural support layer alone but can also play an active role in the bolometer operation in addition to being a structural support layer.

Figure 9:
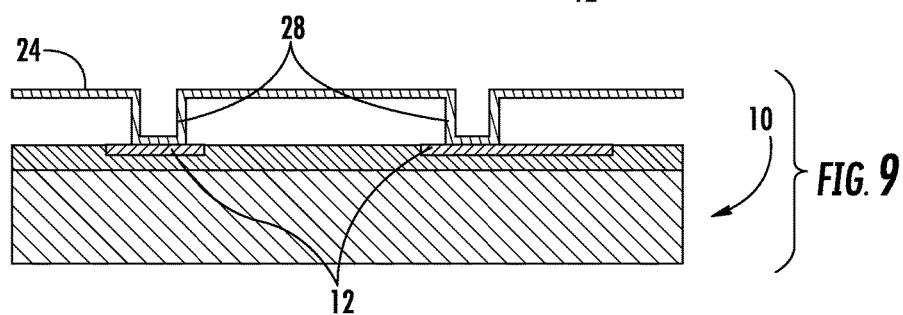
FIG. 9 depicts another embodiment in which the titanium nitride layer is used as both the structural layer and the functional layer for the bolometer.

As an alternative to the use of a bolometer stack comprising a TiN layer in conjunction with a functional layer, such as platinum, a bolometer may be provided with only a TiN layer 24 that is configured to serve as both the structural support and the functional layer of the absorber as depicted in FIG. 9. Since TiN has a TCR, is electrically conductive, has very acceptable thermal conductance, and is structurally rigid, it possesses all the necessary and sufficient properties to function by itself as a stand-alone bolometer layer. The TiN thickness could, for example, vary from 5 nm (or less) to 60 nm (or more), depending on whichever is structurally rigid and repeatable without compromising bolometer functionality.

Figure 10:
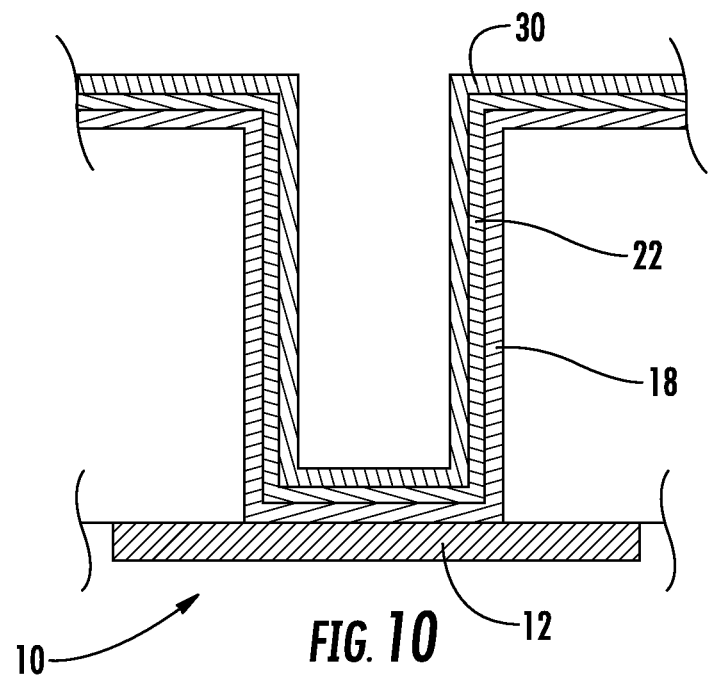
FIG. 10 depicts an embodiment of a bolometer layer sequence that includes an additional titanium nitride layer to form a tri-layer stack.
Figure 11:
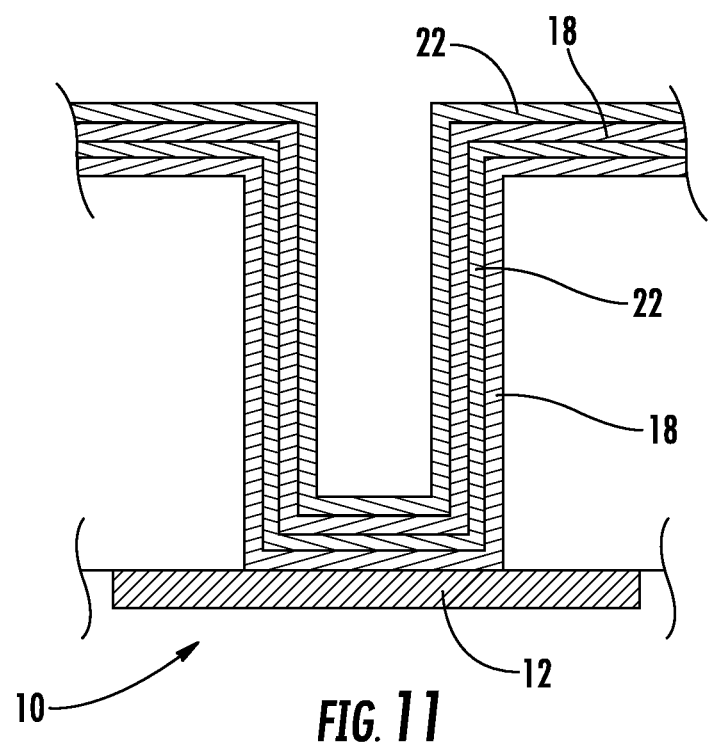
FIG. 11 depicts an embodiment of a bolometer layer sequence that includes alternating sequence of titanium nitride and platinum.

In alternative embodiments, TiN and Pt can be provided in additional layers and layer sequences to control the overall TCR of the bolometer and achieve desired performance characteristics. As one example, a bolometer may be provided with a symmetric tri-layer stack made of TiN/Pt/TiN as depicted in FIG. 10. In this embodiment, after the titanium nitride layer 18 and the platinum functional layer has been deposited, an additional titanium nitride layer 30 may be deposited onto the platinum functional layer 22. FIG. 11 depicts an alternative embodiment in which an alternating sequence of structural layers 18 (e.g., titanium nitride) and functional layers 22 (e.g., platinum) are used to form the bolometer. In both FIGS. 10 and 11, each of the bolometer layers 18, 22, 30 may have a thickness that is approximately 10 nm or less and may be deposited using an ALD process. Significant IR absorption should occur in all the layers. Further, the respective temperature coefficient of resistances are combined to produce a temperature coefficient of resistance that can alter the behavior of the bolometer in a predetermined manner. For example, the tri-layer sequence (FIG. 10) and alternating layer sequence (FIG. 11) can result in a combined temperature coefficient of resistance that enables a stronger bolometer signal in response to the sensed temperature.

Figure 12:
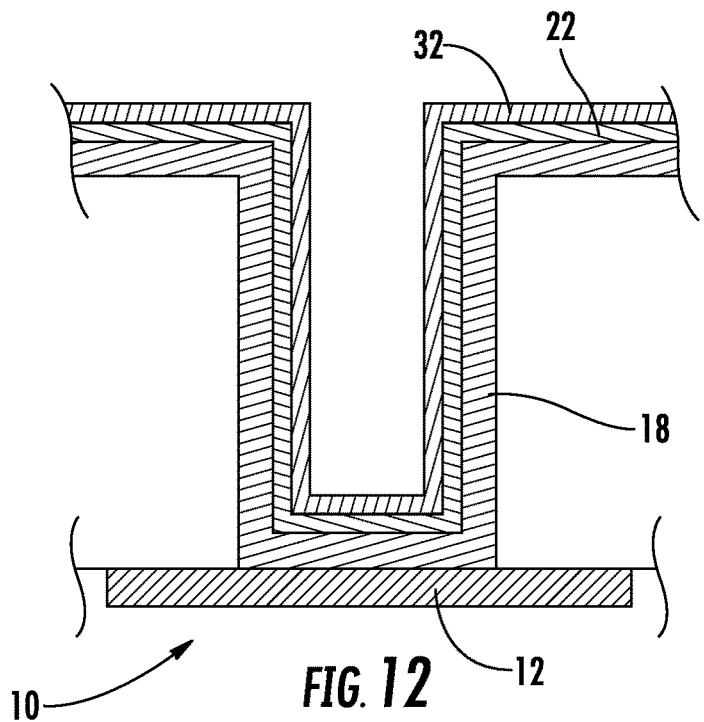
FIG. 12 depicts an embodiment of a bolometer having asymmetrical layer thicknesses.

Layer stacks and sequences including TiN and Pt may be provided in non-symmetric layer thicknesses such as depicted in FIG. 12. In FIG. 12, a bolometer layer sequence is depicted that comprises a structural layer 18 of titanium nitride followed by a functional layer 22 of platinum followed by a second layer 32 of titanium nitride. In this embodiment, the first titanium nitride layer 18 has a greater thickness than the subsequent layers 22, 32 which enables the layer 18 to have a stronger structure. The second titanium layer 32 can be used help maintain the structural integrity of bolometer, to provide protection for the functional layer 22, and also to aid in the absorption of infrared radiation.

Figure 13:
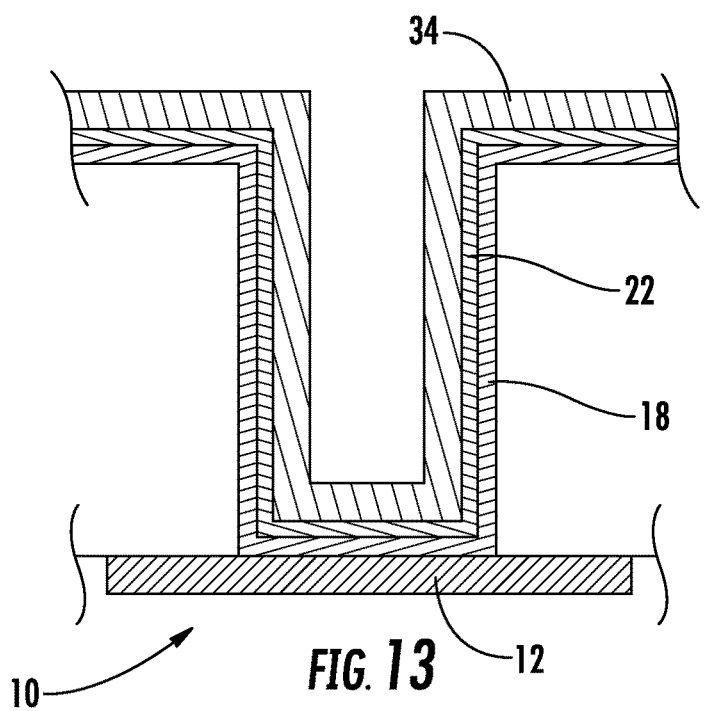
FIG. 13 depicts an embodiment of a bolometer having an additional layer of alumina.

It is also possible that layers of other materials, including alumina, could be added to the stack to impart various characteristics to the stack. Referring to FIG. 13, such a stack could be formed by a titanium nitride structural layer 18 followed by a functional layer 22 of platinum followed by an alumina layer 34 to form a layer sequence, e.g., of $Al_2O_3$/Pt/TiN. In this embodiment, the TiN layer 18 can be used to provide the electrical connection between the Pt layer 22 and the bond pads or metal runners 12 on the substrate. The alumina could be used to add to the structural strength of the absorber without having to pattern the alumina to make electrically contact to the functional layer.

Although not required to making an electrical connection to a functional absorber layer, TiN can be patterned if needed or required for different applications much faster than alumina. For example, chlorine based plasma can be used to etch TiN which can be mixed with fluorocarbons to slowdown etch rates and gain more control for TiN etch profiles. TiN can also be etched using $O_2$ and $F_6$ gas sources. Focused Ion-Beam (FIB) and Argon-based Ion Milling can also be employed for patterning TiN. A plasma chemistry with SF6 and Argon (with about 50% SF6 in the mixture) has been shown to etch both TiN and platinum films. Such a process would considerably simplify the overall processing of the bolometer structure.

Such TiN-only bolometers enjoy significantly simplified process flow. Since TiN is a widely used material in CMOS, the entire process flow could be implemented in a CMOS foundry right on-top of the interface integrated circuit (IC) on the very same substrate. As an example, the inter-medal dielectrics (mostly oxides) in a CMOS stack can be used as the sacrificial layer for the bolometer. The 'release' of the bolometer could be performed using Hydrofluoric Acid (either in liquid or vapor form). This CMOS-based bolometer process flow could also be extended to other bolometer stacks described above.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A semiconductor device comprising:
   a silicon substrate;
   conductive elements formed on the silicon substrate; and
   a bolometer formed on the silicon substrate, the bolometer including a structural layer shaped to define anchor structures and a support portion, the anchor structures being positioned in contact with the conductive elements and extending from the conductive elements away from the silicon substrate to space the support portion of the structural layer apart from the silicon substrate,
   wherein the support portion extends between and is contiguous with the anchor structures such that the structural layer forms a continuous layer that encompasses the anchor structures and the support portion,
   wherein the structural layer is electrically connected to the conductive elements,
   wherein the structural layer, including the anchor structures and the support portion, is formed of titanium nitride,
   wherein the structural layer has a thickness of 5 nm to 60 nm,
   wherein the bolometer further comprises a functional layer formed of a metal material that extends continuously along a top surface of the structural layer such that it follows contours of the support portion and the anchor structures of the structural layer, and
   wherein the structural layer is interposed between the functional layer and the conductive elements and is used to electrically connect the functional layer to the conductive elements.

2. The semiconductor device of claim 1, wherein the functional layer is formed of platinum.

3. The semiconductor device of claim 2, wherein the functional layer has a thickness of approximately 10 nm or less.

4. The semiconductor device of claim 1, wherein the conductive elements are formed at least partially on top of an oxide layer on the silicon substrate.

5. The semiconductor device of claim 4, wherein the conductive elements comprise bond pads.

6. The semiconductor device of claim 2, further comprising:
   an additional titanium nitride layer formed on top of the functional layer,
   wherein the structural layer comprising titanium nitride, the functional layer comprising platinum and the additional titanium nitride layer each have a thickness of approximately 10 nm or less.

7. The semiconductor device of claim 2, further comprising:
   an additional layer comprising alumina formed on top of the functional layer.

* * * * *